United States Patent
Schafer et al.

(10) Patent No.: US 8,991,344 B2
(45) Date of Patent: Mar. 31, 2015

(54) FILLING OF A VOLUME ACCUMULATOR IN A CAMSHAFT ADJUSTER

(71) Applicant: Schaeffler Technologies AG & Co. KG, Herzogenaurach (DE)

(72) Inventors: Jens Schafer, Herzogenaurach (DE); Martin Steigerwald, Herzogenaurach (DE); Michael Busse, Herzogenaurach (DE); Jurgen Plate, Gerhardshofen (DE); Steffen Racklebe, Obermichelbach (DE); Andreas Wedel, Emskirchen (DE); Olaf Boese, Nuremberg (DE); Robert Heinemann, Furth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 150 days.

(21) Appl. No.: 13/744,492

(22) Filed: Jan. 18, 2013

(65) Prior Publication Data

US 2013/0199475 A1 Aug. 8, 2013

(30) Foreign Application Priority Data

Feb. 2, 2012 (DE) .................. 10 2012 201 551

(51) Int. Cl.
*F01L 1/34* (2006.01)
*F01L 1/344* (2006.01)
*F16K 15/00* (2006.01)
*F16K 11/07* (2006.01)

(52) U.S. Cl.
CPC ............. *F01L 1/344* (2013.01); *F16K 15/00* (2013.01); *F01L 1/3442* (2013.01); *F01L 2001/34433* (2013.01); *F01L 2001/34446* (2013.01); *F16K 11/0716* (2013.01)
USPC ...................................... 123/90.17

(58) Field of Classification Search
USPC ........... 123/90.15, 90.17; 137/625.67–625.69
See application file for complete search history.

(56) References Cited

U.S. PATENT DOCUMENTS

| | | | | |
|---|---|---|---|---|
| 5,704,317 A | * | 1/1998 | Barth ......................... | 123/90.17 |
| 2010/0313834 A1 | * | 12/2010 | Auchter et al. ............ | 123/90.15 |
| 2011/0239966 A1 | * | 10/2011 | Strauss ...................... | 123/90.15 |
| 2012/0111295 A1 | * | 5/2012 | Plate et al. ................. | 123/90.15 |
| 2012/0145105 A1 | * | 6/2012 | Bayrakdar ................. | 123/90.17 |
| 2012/0234275 A1 | * | 9/2012 | Fischer et al. ............. | 123/90.17 |

FOREIGN PATENT DOCUMENTS

WO 2011032805 3/2011

* cited by examiner

*Primary Examiner* — Thomas Denion
*Assistant Examiner* — Steven D Shipe
(74) *Attorney, Agent, or Firm* — Volpe and Koenig, P.C.

(57) ABSTRACT

A directional valve (30) for controlling a hydraulic oil flow from a pressure port (34) via working chambers of a camshaft adjuster (4) to a tank port (58). The directional valve (30) includes an accumulator port (36) for conducting at least a part of the hydraulic oil flowing out of a working chamber into a volume accumulator (54) before said hydraulic oil flows out into the tank port (58), and the accumulator port (36) is connected via a passage (60) to the pressure port (34).

7 Claims, 6 Drawing Sheets

FILLING OF A VOLUME ACCUMULATOR IN A CAMSHAFT ADJUSTER

INCORPORATION BY REFERENCE

The following documents are incorporated herein by reference as if fully set forth: German Patent Application No. 102012201551.5, filed Feb. 2, 2012.

FIELD OF THE INVENTION

The invention relates to a directional valve for controlling a hydraulic oil flow from a pressure port via working chambers of a camshaft adjuster to a tank port, the camshaft adjuster, an internal combustion engine having the camshaft adjuster, a method for filling a volume accumulator in a camshaft adjuster, and a control device for carrying out the method.

BACKGROUND OF THE INVENTION

Camshaft adjusters are technical assemblies for adjusting the phase relationship between a crankshaft and a camshaft in an internal combustion engine.

From WO 2011 032 805 A1, it is known to arrange a volume accumulator in a camshaft adjuster, wherein hydraulic liquid can be drawn from said volume accumulator by the pressure chambers in the event of a negative pressure.

FIG. 6 shows a camshaft adjuster including working chambers 76, 78 that are in communication with a volume accumulator 80 according to one known arrangement in the prior art.

SUMMARY

It is an object of the invention to improve the known camshaft adjusters.

The object is achieved by one or more features of the invention. Preferred refinements are described below and in the claims.

The invention provides that the volume accumulator be filled with hydraulic liquid directly via the pressure port of the camshaft adjuster.

This is based on the consideration that an adequate fill level in the volume accumulator is ensured, due to the centrifugal force during operation of the camshaft adjuster, by the radial boundaries of the volume accumulator. If the volume accumulator is arranged for example in the vanes of the rotor, said radial boundaries are the outer diameter of the hollow vane and the inner diameter, if the outlet to the tank is arranged there. Due to the centrifugal force, however, the filling is rotational-speed-dependent.

The invention is also based on the consideration that, after the shutdown of an internal combustion engine comprising the camshaft adjuster, as a result of the decrease in rotational speed and the associated decrease in centrifugal force, the fill level in the volume accumulator of the camshaft adjuster decreases, and when the internal combustion engine is at a standstill, said fill level is at a minimum corresponding to the angular position of the volume accumulator.

In this regard, the invention is based on the realization that, upon a restart of the internal combustion engine, the fill level of the volume accumulator increases only slowly due to leakage volume flows, such that a full adjustment with the camshaft adjuster is possible only after a certain time at which an adequate filling of the volume accumulator has been attained.

Based on this realization, the invention is based on the concept of filling the volume accumulator initially not with hydraulic liquid flowing out of the pressure chambers of the camshaft adjuster but rather with hydraulic liquid provided directly from the pressure port. In this way, an adequate filling can be provided in the volume accumulator promptly during starting of the internal combustion engine.

The invention therefore specifies a directional valve for controlling a hydraulic oil flow from a pressure port via working chambers of a camshaft adjuster to a tank port. The specified directional valve comprises an accumulator port for conducting at least a part of the hydraulic oil flowing out of a working chamber into a volume accumulator before said hydraulic oil flows out into the tank port. According to the invention, the accumulator port is connected via a passage to the pressure port.

Through the passage, the directional valve can fill a volume accumulator in a camshaft adjuster particularly quickly during starting of an internal combustion engine, such that an unlocking of the camshaft adjuster and an adjustment between the camshaft and the crankshaft of the internal combustion engine can take place after a short time. This is advantageous in particular in the case of internal combustion engines which are shut down and restarted again particularly frequently, such as for example internal combustion engines in vehicles with a start/stop system. Furthermore, the invention reduces high dynamic loading and undesired noises in the camshaft adjuster, such as arise if an inadequate amount of hydraulic liquid is present in the volume accumulator and therefore air is drawn into the pressure chambers of the camshaft adjuster. This air which is drawn in leads to the loss of the hydraulic tension and can lead to unstable behaviour of the camshaft adjuster as a whole.

In one refinement of the invention, the passage between the pressure port and the accumulator port is formed as an axial groove. The axial groove can be formed into a surface of the specified directional valve using simple means, for example by milling.

In an additional refinement of the invention, the specified central valve comprises a sleeve which at least partially covers the axial groove. In this way, the axial groove and therefore the passage can be more effectively hydraulically separated from the other ports of the directional valve.

In one particular refinement of the invention, the passage is guided past the working chambers.

In another refinement of the invention, the specified directional valve comprises a control piston. This control piston connects the working chambers to the pressure port or to the tank port, wherein the passage is guided at least partially through the control piston.

In another refinement, the specified control piston comprises a switch for closing off the passage. By means of the switch, the volume accumulator, after being filled with hydraulic liquid, can be separated from the pressure port such that the hydraulic fluid stored in the volume accumulator is stored at a lower pressure than the pressure that has been built up in the pressure chambers, such that the pressure chambers and thus the rotor of the camshaft adjuster can be dynamically adjusted.

In one particular refinement of the invention, the switch is formed as a valve slide which is movable in the control piston. In this way, no additional installation space is required in the camshaft adjuster for integrating the switch.

The invention also provides a camshaft adjuster comprising a stator for absorbing rotational energy from a crankshaft of an internal combustion engine, comprising a rotor, which is mounted in the stator, for outputting the rotational energy to a camshaft for controlling the internal combustion engine, and comprising a directional valve as previously described which can be screwed axially into the camshaft and which serves for controlling the position of the rotor relative to the stator.

The invention also provides an internal combustion engine comprising a combustion chamber, comprising a crankshaft which is driven by the combustion chamber, comprising a camshaft which controls the combustion chamber, and comprising a specified camshaft adjuster for transmitting rotational energy from the crankshaft to the camshaft.

The invention also provides a method for filling a volume accumulator in a camshaft adjuster with a hydraulic liquid. The specified method comprises the steps: connecting the volume accumulator to a pressure port of the camshaft adjuster, and shutting off the connection when the volume accumulator has been filled.

Refinements of the method may be method steps which analogously realize the features of the specified directional valve.

The invention also specifies a control device for a camshaft adjuster, which control device is suitable for carrying out the specified method.

In one refinement, the control device has a memory and a processor. Here, the method is stored in the form of a computer program in the memory, and the processor is provided for carrying out the method when the computer program is loaded from the memory into the processor.

BRIEF DESCRIPTION OF THE DRAWINGS

Exemplary embodiments of the invention will be explained below on the basis of the drawings, in which.

DETAILED DESCRIPTION OF THE PREFERRED EMBODIMENTS

Figure 1:
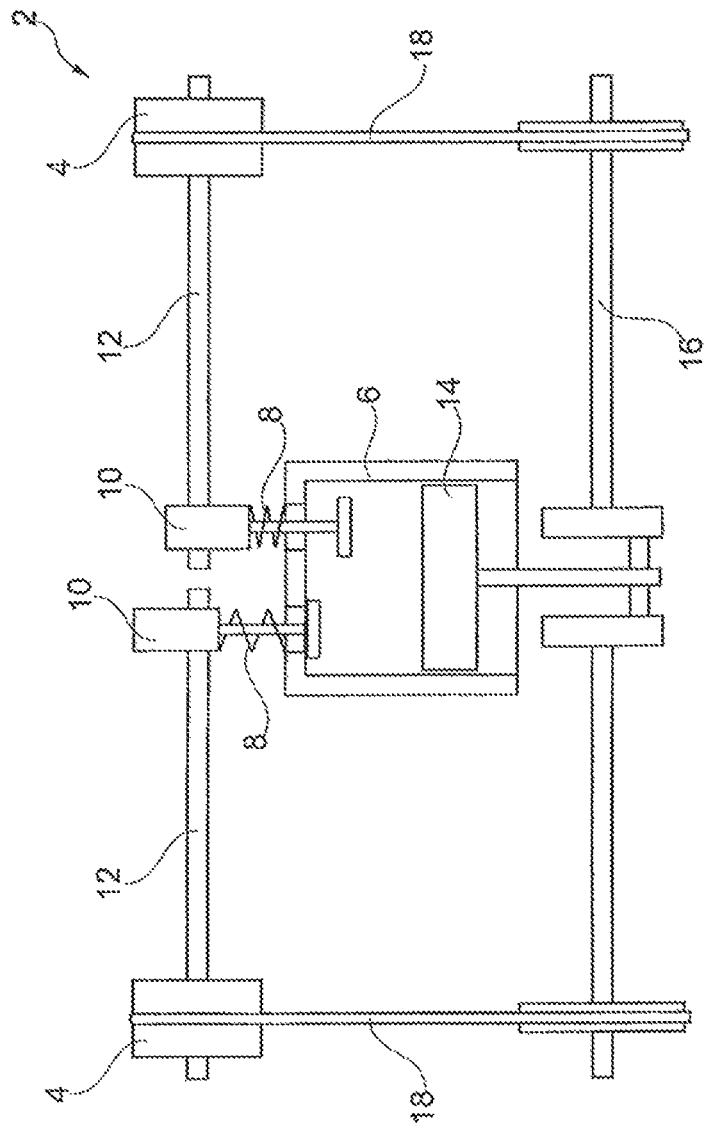
FIG. 1 is a schematic illustration of an internal combustion engine with camshaft adjusters.

In the Figures, identical elements are denoted by the same reference numerals and will be described only once.

Reference is made to FIG. 1, which is a schematic illustration of an internal combustion engine 2 with camshaft adjusters 4.

The internal combustion engine 2 comprises, in a manner known per se, a combustion chamber 6 which can be opened and closed by valves 8. The valves are actuated by cams 10 on corresponding camshafts 12. In the combustion chamber 6 there is also accommodated a reciprocating piston 14 which drives a crankshaft 16. The rotational energy of the crankshaft 16 is transmitted, at the axial end thereof, via a drive element 18 to the camshaft adjuster 4. In the present example, the drive element may be a chain or a belt.

The camshaft adjusters 4 are mounted axially in each case on one of the camshafts 12, receive rotational energy from the drive element 18 and output rotational energy to the camshafts 12. Here, the camshaft adjusters 4 can temporarily slow or accelerate the rotation of the camshaft 12 relative to the crankshaft 14 in order to vary the phase relationship of the camshafts 12 relative to the crankshaft 16.

Figure 2:
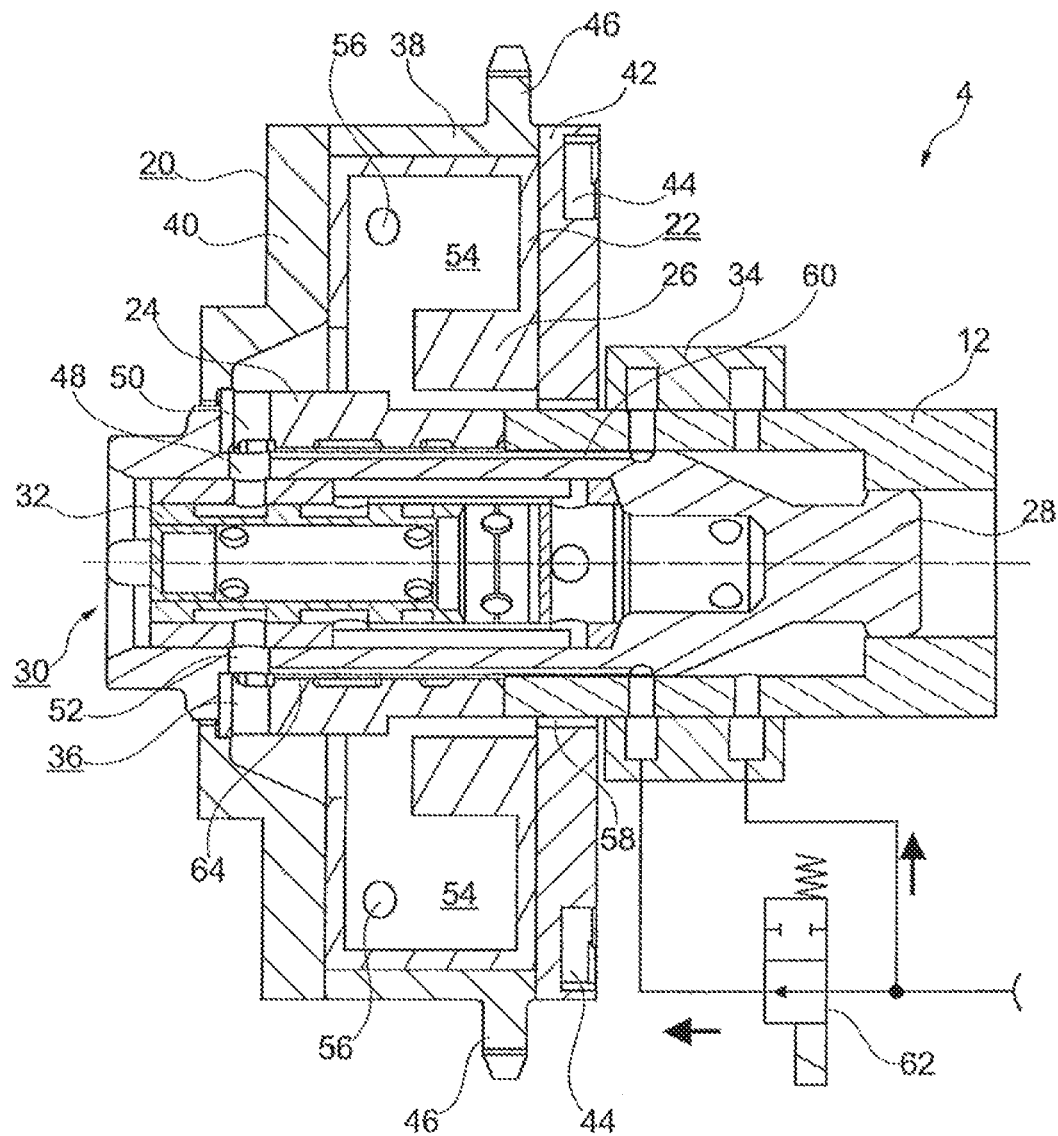
FIG. 2 shows a sectional view of a camshaft adjuster from FIG. 1.
Figure 3:
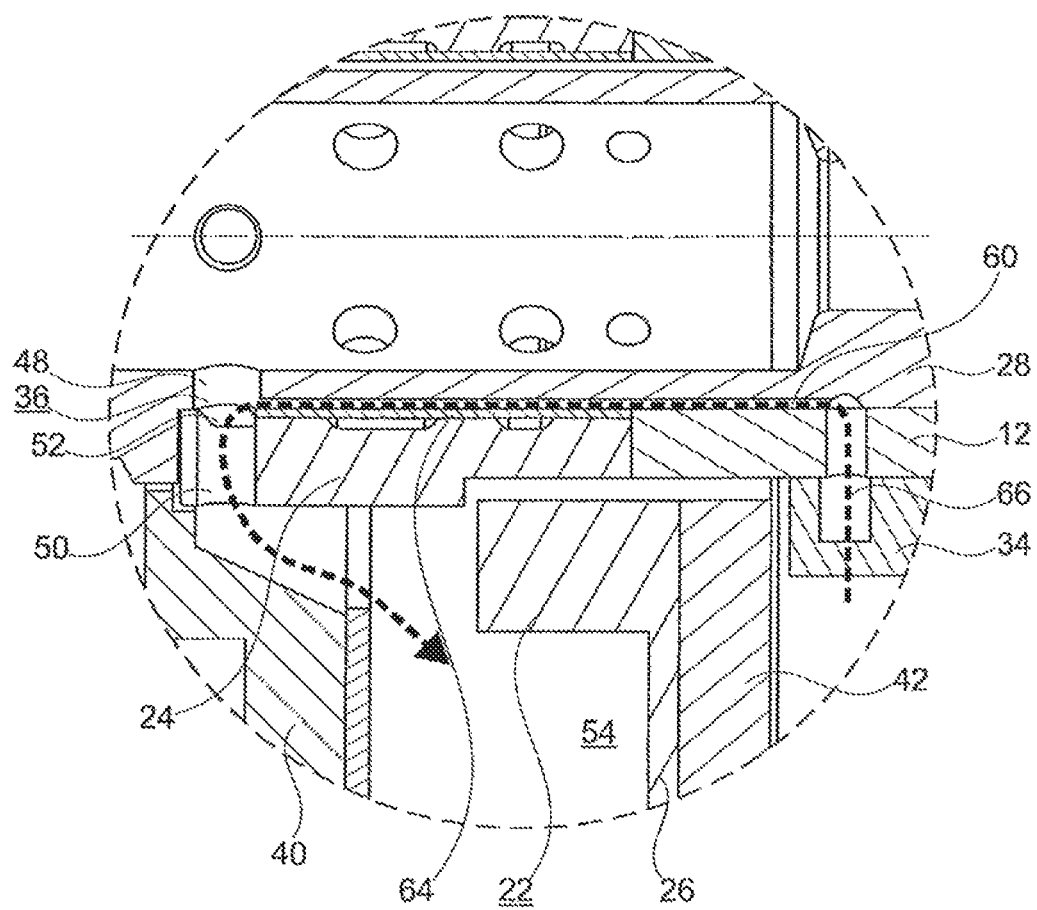
FIG. 3 shows a detail of the camshaft adjuster from FIG. 2.

Reference is made to FIGS. 2 and 3, which show a sectional view of one of the camshaft adjusters 4 from FIG. 1.

The camshaft adjuster 4 has a stator 20 and a rotor 22 which is received in the stator 20.

The rotor 22 is received concentrically in the stator 20 and has vanes 26 which project from a hub 24 of the rotor. The rotor 22 is held concentrically by a central screw 28, which can be screwed into one of the camshafts 12, having a central valve 30, in which a control piston 32 is accommodated in an axially movable manner, which control piston can be moved axially in the central screw 28 by a plunger (not shown) of a central magnet and can be pushed axially out of the central screw 28 by a spring (not illustrated in any more detail). Depending on the position of the control piston 32 in the central screw 28, pressure chambers (not illustrated in any more detail) of the camshaft adjuster 4 are connected, in a manner known per se, to a pressure port 34 or to a volume accumulator port 36, via which a hydraulic liquid pumped into the pressure chambers can be correspondingly discharged from said pressure chambers again.

The stator 20 has an annular outer part 38 from which segments (not illustrated in any more detail) project radially inward. The annular outer part 38 is closed off axially by a front cover 40 and a rear cover 42, wherein the covers 40, 42 are held on the annular outer part 38 by screws 44. On the radial circumference of the annular outer part 38 there are formed teeth 46 into which the drive element 18 can engage.

The central screw 28 has, as a volume accumulator port 36, radial bores 48 to which are connected axial passages 50 through the rotor 22. The passages 50 are arranged radially on a circumferential groove 52 on the radially inner side, which is directed toward the central screw 28, of the rotor 22 such that the central valve 30 need not be screwed into the camshaft 12 in a predetermined angular position.

The passages 50 lead into the volume accumulators 54, which are delimited by the rotor 22 and by the front cover 40. The volume accumulators 54 are open to the pressure chambers of the camshaft adjuster 4 via check valves 56, wherein the flow of the hydraulic liquid is possible only from the volume accumulator 54 to the pressure chamber, such that the pressure chamber can draw stored hydraulic liquid from the volume accumulator 54 in the event of a negative pressure. If the volume accumulator 54 overflows with too large an amount of hydraulic liquid, the excess hydraulic liquid is discharged via a tank port 58 for example to an oil pan (not shown). The tank port 58 is situated closer to the axis of rotation than the check valves 56, such that, during operation of the camshaft adjuster, due to the centrifugal force, the hydraulic liquid firstly reaches the check valves 56 before overflowing via the tank port 58.

The pressure port 34 is furthermore connected directly to the accumulator port 36 via an axial groove 60 in the central screw 28. The axial groove 60 in the central screw 28 thus constitutes a bypass via which a flow of hydraulic liquid from the pressure port 34 bypasses the pressure chambers of the camshaft adjuster. The direct flow of hydraulic liquid from the pressure port 34 to the accumulator port 36 can, in the present embodiment, be controlled by a schematically illustrated 2/2 directional valve 62.

When the internal combustion engine 2 is set in operation, the 2/2 directional valve 62 opens the pressure port 34 with respect to the axial groove 60 such that hydraulic liquid is forced through the pressure port 34 directly into the volume accumulator 54. When the volume accumulator 54 has been completely filled with hydraulic liquid, the 2/2 directional valve 62 closes the pressure port again for the axial groove 60.

The further operation of the camshaft adjuster 4 then takes place in a manner known per se.

In the present embodiment, the pressure port 34 has two inlets to which hydraulic liquid is supplied from the same schematically indicated pressure source, wherein one of the two inlets is controlled by the 2/2 directional valve 62. The pressure port 34 could however also comprise a 3/2 directional valve which conducts the hydraulic liquid to the accumulator port 36 via the axial groove 60 or in the known way to the working ports (not referenced in any more detail) of the camshaft adjuster 4, for example if the pressure source can be shut off. If the pressure source cannot be shut off, the pressure port 34 could also comprise a 3/3 directional valve which operates in the above way and which additionally also completely prevents the supply of hydraulic liquid.

A sleeve 64 is mounted axially onto the camshaft 12 and radially onto the axial groove 60 in the central screw 28, which sleeve prevents a radial escape of hydraulic liquid from the axial groove 60.

In FIG. 3, the flow of the hydraulic liquid from the pressure port 34 to the pressure port 36 is indicated by a dashed arrow 66.

Figure 4:
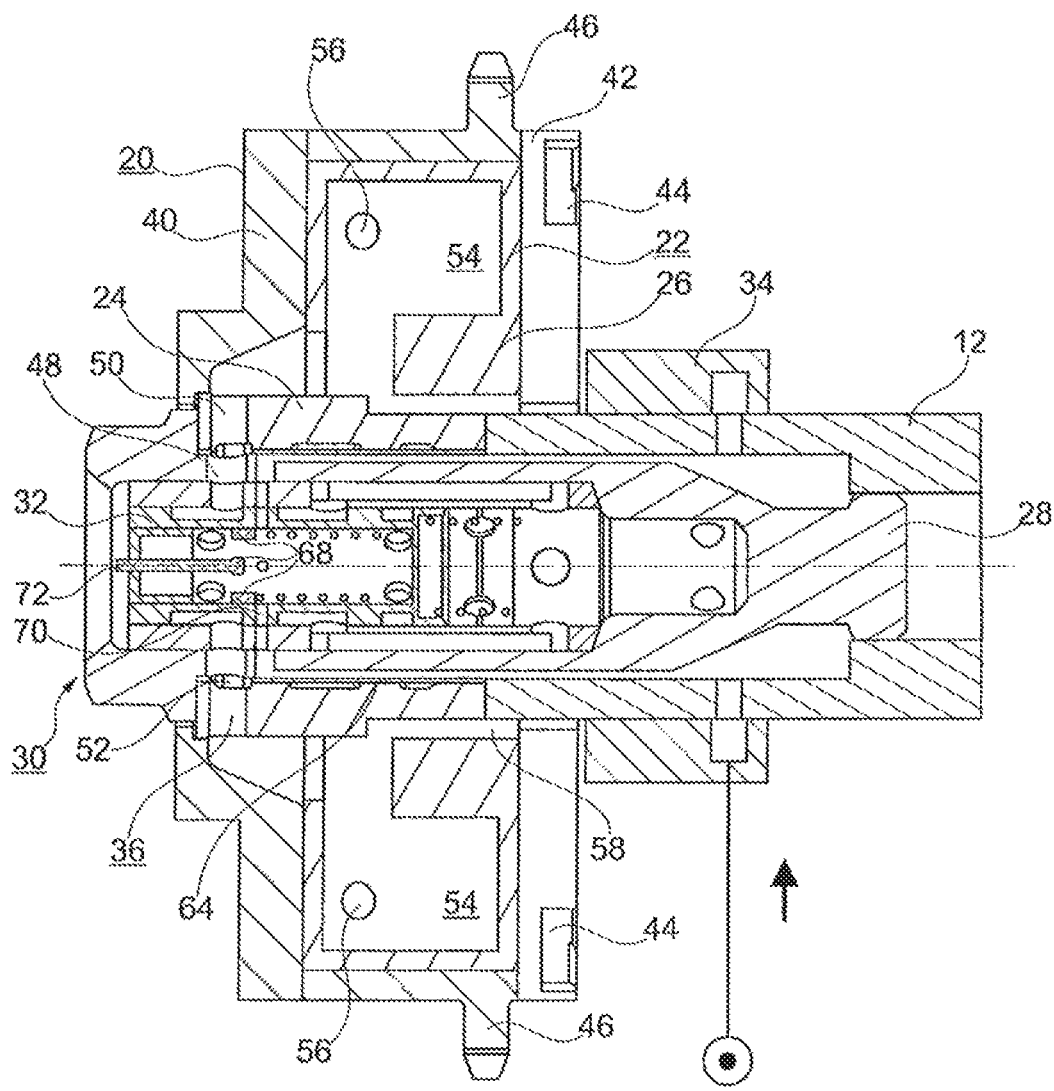
FIG. 4 shows a sectional view of an alternative camshaft adjuster from FIG. 1.
Figure 5:
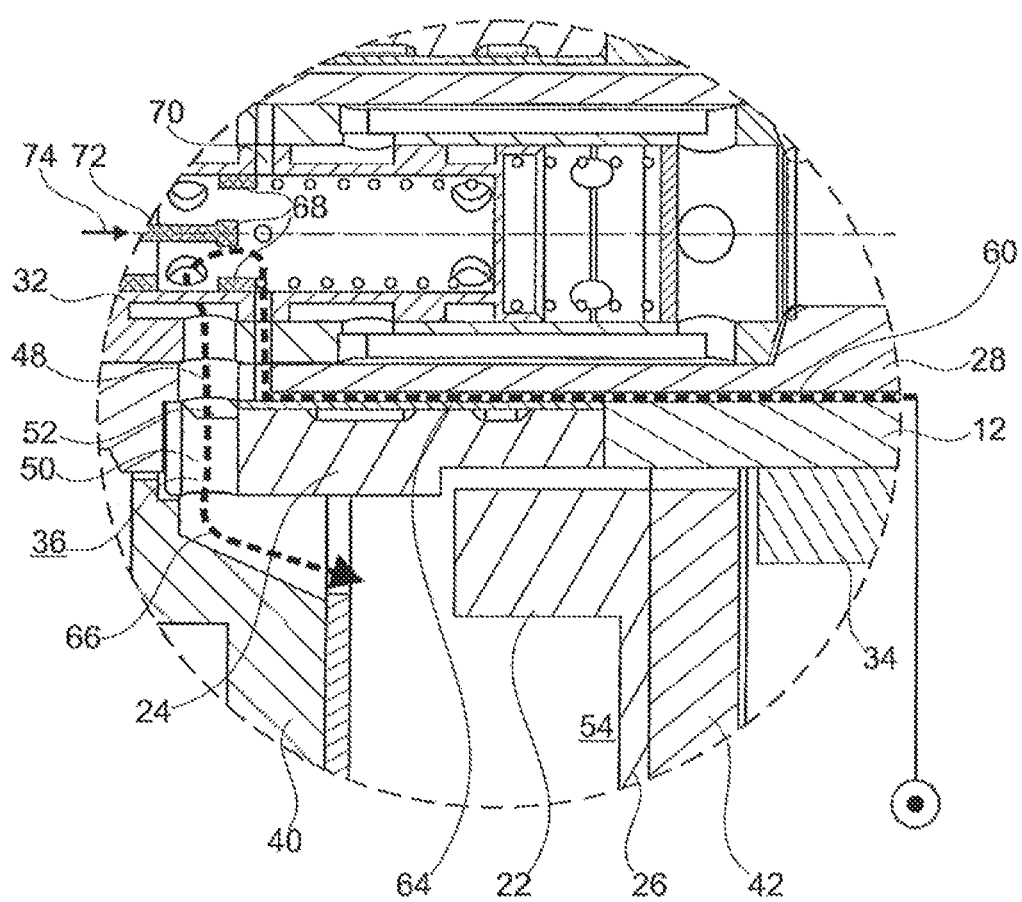
FIG. 5 shows a detail of the camshaft adjuster from FIG. 4.
Figure 6:
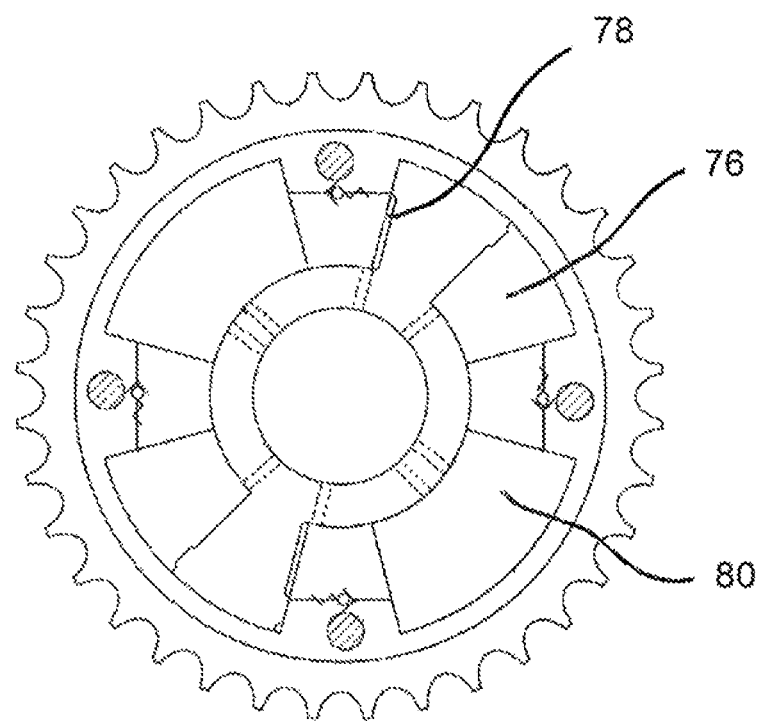
FIG. 6 shows a camshaft adjuster including working chambers and a volume accumulator according to the prior art.

Reference is made to FIGS. 4 and 5, which show a sectional view of one of the camshaft adjusters 4 from FIG. 1 as per a further example.

In FIG. 4, there is received in the control piston 32, a valve slide 68 which is axially movable relative to said control piston. Furthermore, the axial groove 60 is open in the inward direction via a radial bore 70 which leads through the central screw 28 and the control piston 32.

The valve slide 68 has a projection 72 which projects axially beyond the control piston. If an actuator (not shown), for example a central magnet, engages the control piston 32 in order to actuate the directional valve 30 in a manner known per se as indicated in FIG. 5 by an arrow 74, this actuator initially moves the valve slide 68 via the projection 72 and thereby closes off the radial bore 70. Only thereafter is the control piston 32 moved onward in the manner known per se.

In an initial position of the actuator and therefore of the control piston 32 with the valve slide 68, the radial bore 70 is open and allows hydraulic fluid to flow into the interior of the control piston directly from the pressure source via the axial groove 60. This hydraulic fluid then flows via the accumulator port 36 into the volume accumulator 54 and fills the latter.

When the volume accumulator has been filled, the actuator actuates the control piston 32 as already mentioned in the known way, whereby the supply of hydraulic liquid directly from the pressure source into the interior of the control piston 32 via the axial groove 60 is automatically shut off.

LIST OF REFERENCE NUMERALS

2 Internal combustion engine
4 Camshaft adjuster
6 Combustion chamber
8 Valve
10 Cam
12 Camshaft
14 Reciprocating piston
16 Crankshaft
18 Drive means
20 Stator
22 Rotor
24 Hub
26 Vane
28 Central screw
30 Central valve
32 Control piston
34 Pressure port
36 Accumulator port
38 Annular outer part
40 Front cover
42 Rear cover
44 Screw
46 Tooth
48 Radial bore
50 Passage
52 Circumferential groove
54 Volume accumulator
56 Check valve
58 Tank port
60 Axial groove
62 Directional valve
64 Sleeve
66 Arrow
68 Valve slide
70 Radial bore
72 Projection

The invention claimed is:

1. A camshaft adjuster including a directional control valve for controlling a hydraulic oil flow from a pressure port via working chambers of the camshaft adjuster to a tank port, comprising an accumulator port for conducting at least a part of the hydraulic oil flow out of one of the working chambers into a volume accumulator before said hydraulic oil flows out into the tank port, and the accumulator port and the pressure port are in direct, uninterrupted connection with each other via a passage, wherein the passage between the pressure port and the accumulator port is formed by an axial groove, wherein the axial groove is covered at least partially by a sleeve.

2. The directional valve as claimed in claim 1, wherein the passage is guided past the working chambers.

3. The directional valve as claimed in claim 1, further comprising a control piston for connecting the working chambers to the pressure port or to the tank port, wherein the passage is guided at least partially through the control piston.

4. The directional valve as claimed in claim 3, further comprising a switch for closing off the passage.

5. The directional valve as claimed in claim 4, wherein the switch is formed as a valve slide which is movable in the control piston.

6. The camshaft adjuster of claim 1 further comprising a stator for receiving rotational energy from a crankshaft of an internal combustion engine, comprising a rotor, which is mounted in the stator, for outputting rotational energy to a camshaft for controlling the internal combustion engine, and the directional control valve is screwed axially into the camshaft and which serves for controlling a position of the rotor relative to the stator.

7. An internal combustion engine comprising a combustion chamber, a crankshaft which is driven by the combustion chamber, a camshaft which controls the combustion chamber, and comprising a camshaft adjuster as claimed in claim 6 for transmitting rotational energy from the crankshaft to the camshaft.

* * * * *